(12) United States Patent
Pabon et al.

(10) Patent No.: US 7,729,860 B2
(45) Date of Patent: Jun. 1, 2010

(54) DRILLING SYSTEM POWERED BY ENERGY-HARVESTING SENSOR

(75) Inventors: Jahir Pabon, Wellesley, MA (US); Julio Guerrero, Cambridge, MA (US); Joachim Sihler, Somerville, MA (US); Demosthenis Pafitis, Cambridge (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 358 days.

(21) Appl. No.: 11/490,974

(22) Filed: Jul. 21, 2006

(65) Prior Publication Data

US 2008/0033653 A1 Feb. 7, 2008

(51) Int. Cl.
*G01V 1/40* (2006.01)
(52) U.S. Cl. ......................................................... 702/6
(58) Field of Classification Search ....................... 702/6
See application file for complete search history.

(56) References Cited

U.S. PATENT DOCUMENTS

| | | | |
|---|---|---|---|
| 3,807,502 A | 4/1974 | Heilhecker et al. | |
| 3,957,118 A | 5/1976 | Barry et al. | |
| 4,126,848 A | 11/1978 | Denison | |
| 6,866,306 B2 | 3/2005 | Boyle et al. | |
| 2005/0024231 A1 | 2/2005 | Fincher et al. | |
| 2006/0075748 A1* | 4/2006 | Jones | 60/398 |
| 2006/0086498 A1* | 4/2006 | Wetzel et al. | 166/250.12 |
| 2007/0173214 A1* | 7/2007 | Mickle et al. | 455/127.1 |
| 2007/0182362 A1* | 8/2007 | Trainor et al. | 320/101 |

OTHER PUBLICATIONS

Zhang et al. "A Self-Energized Sensor for Wireless Injection Mold Cavity Pressure Measurement: Design and Evaluation", Journal of Dynamic Systems, Measurement and Control, Jun. 2004, vol. 126, pp. 309-318.
McDonald, "Four Different Systems used for MWD", The Oil and Gas Journal, Apr. 3, 1978. pp. 115-124.

* cited by examiner

*Primary Examiner*—Aditya Bhat
(74) *Attorney, Agent, or Firm*—Brigid Laffey; Vincent Loccisano; James McAleenan

(57) ABSTRACT

A method and system is provided for determining the value of an attribute of ambient energy at a drilling assembly at the bottom of a borehole. Ambient energy includes kinetic energy, hydraulic energy and thermal energy. Attributes include vibration frequency spectrum, pressure difference, and temperature difference. The method uses energy harvested by at least one energy-harvesting sensor to power the system. The system generates data signals from at least one energy-harvesting sensor at one or more locations along a downhole drilling assembly, and transmits data up the borehole.

38 Claims, 12 Drawing Sheets

DRILLING SYSTEM POWERED BY ENERGY-HARVESTING SENSOR

TECHNICAL FIELD

The present invention relates to measurements associated with various drilling systems for use in oil well drilling, and for powering the acquisition of measurements, and for powering the transmission of measurement data to a surface station from locations in a borehole.

BACKGROUND OF THE INVENTION

Drilling an oil well is typically done with a drill bit attached to a long string of drill pipe, called the drill string. The drill string consists of individual sections of drill pipe, each about 40 ft in length with screw joints at each end. Depending on the geological situation, a drill string can be tens of thousand feet long. The drilling torque is usually transmitted from the drilling rig to the bit through the drill string, whereas the axial thrust force or "weight on bit" is provided by the weight of the drill string itself. In modern drilling operations, a set of highly sophisticated tools that may include formation measurement and bit steering systems are inserted between the drill bit and the drill string at the bottom of the well. One embodiment of this tool assembly is called a BHA or "Bottom Hole Assembly". The steering or measurement systems are housed inside steel pipe in order to protect them against the high downhole hydrostatic pressures and temperatures.

The electronic circuits, actuators, and telemetry systems inside the BHA require electric power to operate. In many cases, electricity is provided by turbine generators that are placed in the drilling mud stream that flows downhole through the inside of the drill pipe. In cases where this is not practical or when continuous power is needed even during mud pump interruptions, batteries are used. While mud turbines can provide a large amount of electrical power, they have high maintenance cost. The use of batteries is also quite expensive due to the amount of space they occupy, along with the associated high costs of environmentally friendly disposal.

Running power cables along the drill string has proven to be impractical and problematic. Prior art relating to these efforts is disclosed in U.S. Pat. No. 4,126,848 to Denison, "Drill String Telemeter System"; U.S. Pat. No. 3,957,118 to Barry et al: "Cable System for use in a Pipe String and Method for Installing and Using the same"; and U.S. Pat. No. 3,807,502 to Heilhecker et al., "Method for Installing an Electric Conductor in a Drill String"; and the publication "Four Different Systems Used for MWD", W. J. McDonald, The Oil and Gas Journal, pp 115-124, 3 Apr. 1978. Such systems are believed to have suffered from poor reliability and high cost due to of the large number of electrical connectors.

IFP, an international research and development company located in France, developed a system known as "Simphor" which used wireline cables and large, robust wet connectors. It has never been commercialized for measurement while drilling applications. This system is believed to have suffered from interference with the drilling process.

The use of low loss inductive couplers for use in wired pipe strings is known. U.S. Pat. No. 6,866,306, to Boyle et al, describes the use and basic operation of inductive couplers mounted at the sealing faces of drill pipes. However, some downhole oilfield drilling assemblies contain components that preclude the running of electrical wires along the length of the downhole drilling assembly. Such components present an effective barrier to transmission over wires of electrical power and signals. This barrier makes it extremely difficult to provide electric power from surface equipment to instrumentation at lower locations on the drilling assembly, and also makes it impossible for instrumentation at lower locations on a drilling assembly to transmit electrical signals by wired connection up though the drilling assembly.

An article appearing in the Journal of Dynamic Systems, Measurement and Control, June 2004, Vol. 126, entitled "A Self-Energized Sensor for Wireless Injection Mold Cavity Pressure Measurement: Design and Evaluation", describes a self-energized sensor system for pressure measurement in the injection mold cavity using ultrasound as the information carrier.

During the drilling process of an oil well, the BHA and the drill string experience a great deal of vibrations which stem from the drill bit biting into the formation as well as the dynamics of the drill pipe rotating in the bore hole (axial and lateral vibrations, whirl, stick-slip and torsional vibrations, etc.). The energy contained in these vibrations could be extracted and used to power downhole systems, for example sensors (vibration, temperature, pressure etc.), and telemetry. If an energy harvesting device is used to run a sensing system, power will be needed for the sensor(s), the signal processing electronics and either memory storage or data transmission.

Additionally, knowledge of the resonant characteristics of an energy harvesting device can be used to gather information about the very vibrations (e.g., frequency and amplitude) that the power is harvested from. Since such a device is typically tuned to a certain frequency, the rate of power generation may be used to conclude the frequency of a vibration itself. Simply spoken, only if shaken at its natural frequency, the device will turn on. If it does, some simple electronics may come alive and transmit a standard signal, so that a receiver will be able to notice that this frequency occurred. In combination with prior modal analysis of the BHA, the devices may be tuned to certain "critical" frequencies, and issue a warning signal if those frequencies occur.

In view of the above, a system, apparatus and method for exploiting the inherent vibration present near a drill bit in a drilling assembly for use in power and signal generation is necessary.

SUMMARY OF THE INVENTION

The invention provides a system powered by an energy-harvesting sensor and a method for determining the value of an attribute of ambient energy at a drilling assembly at the bottom of a borehole. Ambient energy includes, but is not limited to, kinetic energy, hydraulic energy and thermal energy. Attributes include, but are not limited to, vibration frequency spectrum, pressure difference, and temperature difference. The system generates data signals from at least one energy-harvesting sensor at one or more locations along a downhole drilling assembly, and transmits data up the borehole. The system is powered by energy harvested by one or more energy-harvesting sensors.

The invention provides a method for determining the value of an attribute of ambient energy at a downhole drilling assembly. In a first preferred embodiment, the invention uses ambient energy to produce a first signal having a first signal energy carrying information representing the value of the attribute, and uses power and information derived from the first signal energy to produce a second signal carrying information representing the value of the attribute. This signal may then be transmitted to a receiver location on the drilling assembly using power derived from the first signal energy.

In a preferred embodiment, the method includes receiving the second signal at a receiver station at a second location on the drilling assembly, transmitting a third signal from the upper location on the drilling assembly to a surface station, and extracting the value of the attribute at the surface station from the third signal.

In the preferred embodiment, the method further includes transmitting the second signal as a wireless signal or transmitting the second signal over a wired connection.

In the preferred embodiment, the method further includes producing the first signal at a lower location on the downhole drilling assembly, receiving the second signal at an upper location on the downhole drilling assembly, and transmitting a third signal carrying information representing the value of the attribute from the upper location.

In the preferred embodiment, the attribute is vibration frequency spectrum. In this embodiment, the method includes transforming ambient energy into vibration of a magnet bearing mass, transforming vibration into a first signal of electrical energy, carrying information representing the value of the vibration frequency spectrum in the signal, storing the first signal as an electric charge in a relaxation circuit; and transmitting the electric charge as a second series of pulses having a second pulse frequency representing a value of the vibration frequency spectrum.

In a second embodiment, the attribute is pressure difference, and the method includes transforming ambient energy of pressure difference into fluid flow, transforming fluid flow into a first signal of electrical energy representing a value of the pressure difference, storing the first signal as an electric charge in a relaxation circuit; and transmitting the electric charge as a second signal representing a value of the pressure difference.

In a third embodiment, the attribute is temperature difference, and the method includes transforming ambient energy of temperature difference into a first signal. In one embodiment, this first signal may have a first series of pulses of electrical energy with a first pulse frequency representing a value of the temperature difference. The electrical energy is stored as an electric charge in a relaxation circuit and the step of transmitting the electric charge as a second series of pulses is practiced.

In the preferred embodiment, directed to determining vibration frequency spectrum, the invention provides a system having a plurality of spaced-apart sensor-transmitter stations at a drilling assembly at the bottom of a borehole, each sensor-transmitter station including an energy-harvesting sensor, wherein this energy-harvesting sensor may be self-powered. This embodiment generates data signals from measurements at a plurality of locations along a portion of a lower end of the drilling assembly, and transmits frequency-multiplexed data signals by wireless transmission from the plurality of locations to a single location at an upper end of the drilling assembly.

The preferred embodiment provides a system for determining the value of an attribute of ambient energy at the drilling assembly, the system adapted for mounting on a downhole drilling assembly, the system including an energy-harvesting sensor, a signal conditioner, and a power conditioner, wherein the energy-harvesting sensor is mounted to receive ambient energy from the drilling assembly and is coupled to deliver a first signal representing the value of the attribute to both the signal conditioner and the power conditioner, and wherein the power conditioner is coupled to deliver conditioned power to the signal conditioner. This embodiment further includes an antenna coupled to receive an output signal from the signal conditioner. In one embodiment, the signal conditioner may include a pulse transformer coupled to receive the first signal as a first series of pulses from the energy-harvesting sensor, and a signal conditioner/driver coupled to receive pulses from the pulse transformer and to produce a second signal carrying a series of pulses for transmission. The second pulse transformer includes a threshold circuit including a relaxation oscillator. One skilled in the appropriate electronic art will readily recognize that numerous alternative forms of first and second signals may be utilized in practicing the present invention.

The preferred embodiment provides a sensor-transmitter station wherein the attribute is vibration frequency spectrum, and the energy-harvesting sensor includes a spring, a mass, a magnet, and a coil, the spring, mass, magnet and coil coupled such that ambient kinetic energy applied at one end of the spring produces vibration in the mass and the magnet, and vibration of the magnet within the coil produces an alternating electric current carrying information representing the value of the attribute.

A second embodiment provides a sensor-transmitter station wherein the attribute is pressure difference, and the energy-harvesting sensor includes a turbine electrical generator having a turbine located within a sample flow line through a wall of the downhole drilling assembly, and a pressure-operated, piston-driven, spring-loaded sleeve valve adapted to control flow through the sample flow line in accordance with the pressure difference.

A third embodiment provides a sensor-transmitter station wherein the attribute is temperature difference, and the energy-harvesting sensor includes a Seebeck Effect electric signal generator.

The invention provides a system for determining the value of an attribute of ambient energy at the surface of a downhole drilling assembly. The system includes a sensor-transmitter station and a receiver station. The sensor-transmitter station is mounted at a first location on the drilling assembly proximate to the drill bit. The sensor-transmitter station includes an energy-harvesting vibration sensor, a signal conditioner, and a power conditioner. The energy-harvesting sensor is mounted to receive ambient energy at the drilling assembly and is coupled to deliver a signal having signal energy (the signal energy carrying information representing the value of the attribute) to the power conditioner and to the signal conditioner. The receiver station is adapted for mounting at a second location on the drilling assembly proximate to the drill string end, and is adapted to receive a signal transmitted by the sensor-transmitter station. The power conditioner is coupled to power the signal conditioner.

In the preferred embodiment, each sensor-transmitter station is adapted to transmit signals that carry a distinct frequency identifying its location on the drilling assembly.

Each of the first, second and third preferred embodiments provide a distributed system for determining the value of an attribute of ambient energy at a plurality of sensor-transmitter station locations. The distributed system is adapted for mounting on a downhole drilling assembly or BHA. The sensor-transmitter stations are mounted at spaced intervals along the body of the drilling assembly. Each sensor-transmitter station includes at least one energy-harvesting sensor and a signal conditioner. A receiver station is mounted on the body of the drilling assembly, at a location above the sensor-transmitter stations. Each sensor-transmitter station is adapted to transform ambient energy into a first signal having signal energy, the signal energy carrying information representing the value of the attribute, such that the energy of the output signal of each sensor-transmitter assembly is derived entirely from signal energy. Each sensor-transmitter station includes an antenna coupled to receive an output signal from its signal conditioner. Each sensor-transmitter assembly is frequency modulated for multiplexing.

In another embodiment, the receiver station is associated with a storage device adapted to receive and store information derived from the output signal of each sensor-transmitter assembly.

In the second embodiment, the attribute is pressure difference and the energy-harvesting sensor includes a turbine electrical generator having a turbine located within a sample flow line through a wall of the downhole drilling assembly, and a pressure-operated, piston-driven, spring-loaded sleeve valve adapted to control flow through the sample flow line in accordance with the pressure difference.

In the third embodiment, the attribute is temperature difference and the energy-harvesting sensor includes a Seebeck Effect electric signal generator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

First Embodiment, Determining an Attribute of Ambient Energy

Figure 1:
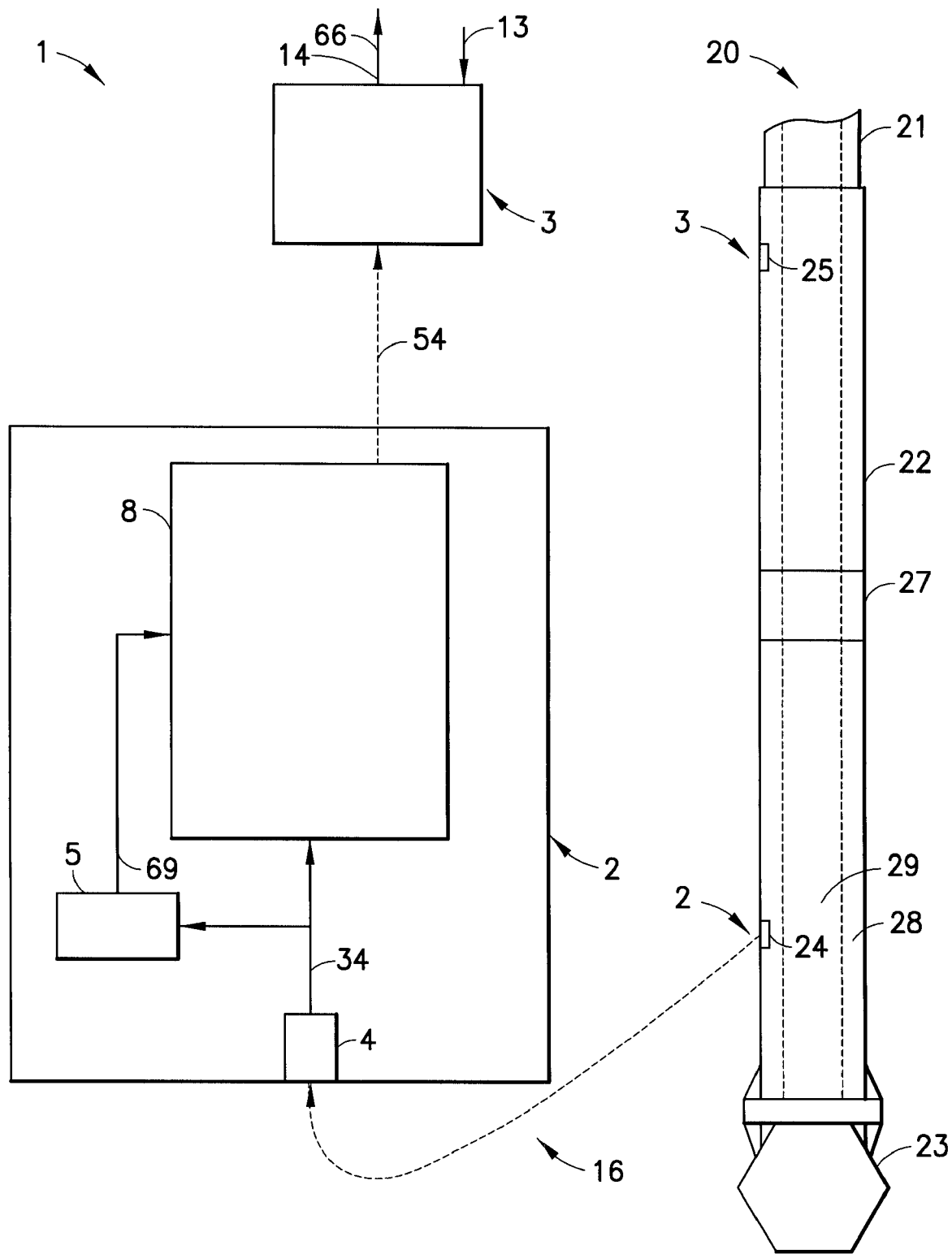
FIG. 1 shows an system powered by ambient energy, and directed to determining the value of an attribute of ambient energy at a downhole drilling assembly.

System 1, shown in FIG. 1, is powered by ambient energy and provides a method for determining the value of an attribute of ambient energy at drilling assembly 22 located at the bottom of a borehole. Attributes include vibration frequency spectrum, pressure difference, and temperature difference. The method of operation is illustrated in the flow chart of FIG. 12.

In FIG. 1, drill string 20 is shown having drill string tubular 21 that extends up the borehole to the surface station (not shown). Drilling assembly 22 includes drill bit 23 and drilling assembly tubing 28. Drilling assembly tubing 28 defines central aperture 29. Drilling assembly 22 is shown having a barrier 27 representing components that generally preclude the running of electrical wires along the length of the drilling assembly.

Figure 12:
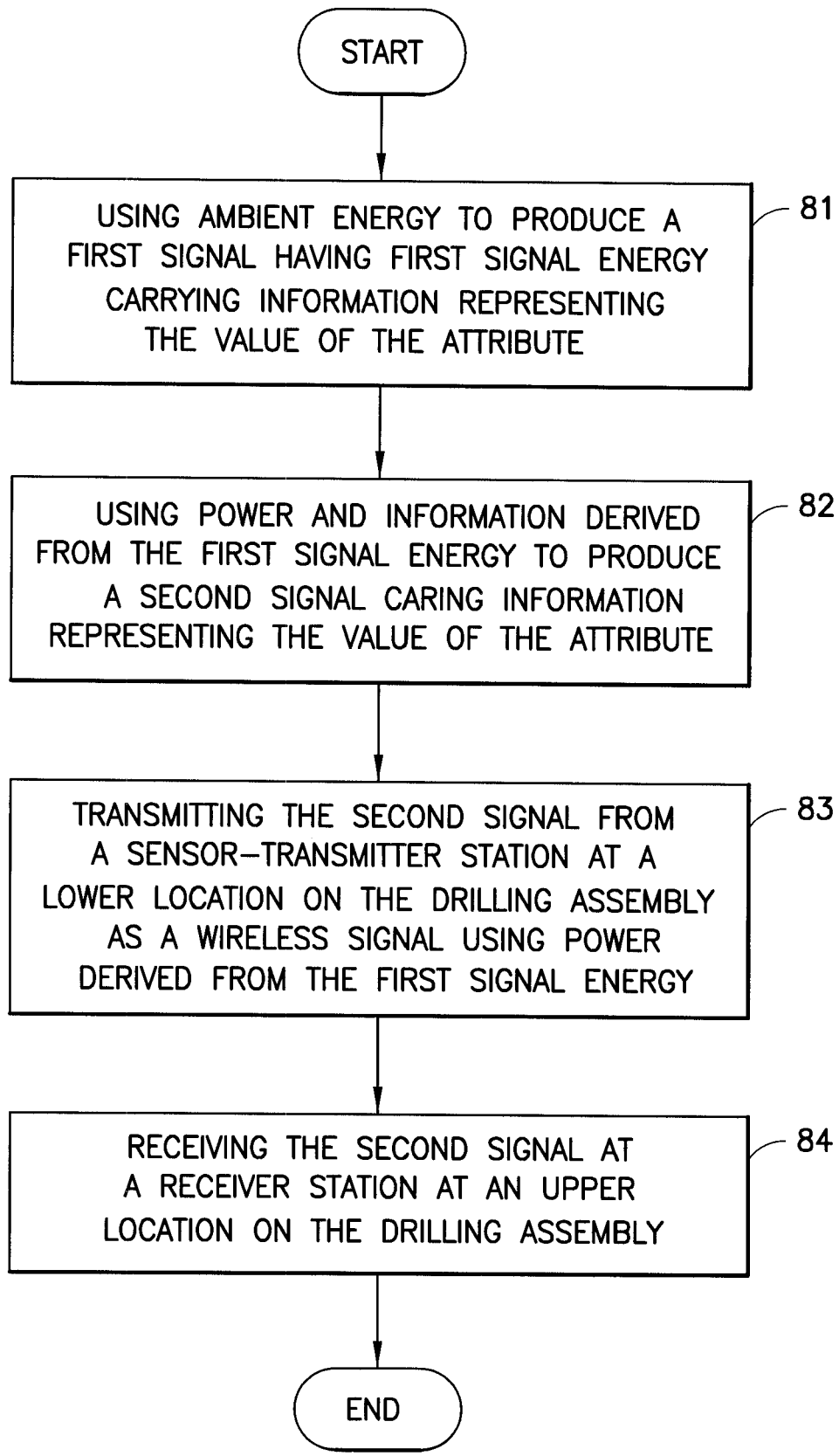
FIG. 12 is a flow chart illustrating the method of operation of the system of FIG. 1.

Referring to FIGS. 1 and 12, System 1 operates as follows. Sensor-transmitter station 2 generates first signal 34 and second signal 54 from ambient energy 16 at location 24 on a first location of downhole drilling assembly 22. As used herein, the terms first and second location may be referred to a lower and upper locations. The use of the terms "lower" and "upper" relative to the drilling assembly, are used solely for illustrative purposes and clarity in the discussion and in not intended to be limiting in scope of the present invention. Sensor-transmitter station 2 uses first signal 34 to make second signal 54, and then transmits second signal 54 up the borehole by wireless transmission from location 24 to receiver station 3 at location 25 of drilling assembly 22. In the present embodiment, a location near the upper end of the drilling assembly is utilized for illustrative purposes. Such an illustration is not intended to be limiting in scope or representative of permissible locations of transmission and reception.

Sensor-transmitter station 2 generates second signal 54 as follows. Energy-harvesting sensor 4 draws energy from ambient energy 16 to produce first signal 34 having signal energy, the signal energy carrying information representing the value of an attribute. Signal conditioner 8 receives a portion of the signal energy of first signal 34 and transforms it into a form suitable for transmission as second signal 54.

Sensor-transmitter station 2 is self-powered, in whole or in part, using energy harvesting as follows. Energy-harvesting sensor 4 draws energy from ambient energy 16 and produces first signal 34 having signal energy. Power conditioner 5 receives a portion of the signal energy of first signal 34 and conditions it to make conditioned electric power 69. Conditioned electric power 69 powers signal conditioner 8.

Referring to FIG. 1, receiver station 3 receives second signal 54 and transmits signal 66 up drill string 20 to surface station along data path 14. In the illustrative embodiment, Receiver station 3 is powered by receiving electric power 13 from surface station (not shown) via drill string 20. One skilled in the art will recognize that such powering means for Receiver station 2, located at a second location, are not intended to be limiting on the scope of the present invention. One skilled in the art will recognize that numerous alternative powering means are applicable to the receiver station. Furthermore, the receiver station, or second location, may transmit signal 66 up the drill string 20 to a surface station using a variety of applicable transmission techniques as understood by one skilled in the art. One such suitable transmission technique is a mud pulse transmission technique as understood by one skilled in the art.

FIG. 12 is a flowchart illustrating the method of operation of System 1. The term "wireless transmission" of step 83 in FIG. 12 is preferably electromagnetic waves but the term as used herein is intended to include the possibility of numerous alternative transmission mechanisms, including, but not limited to, optical or acoustic transmission as well as various means of wired transmission.

First Preferred Embodiment, Determining Vibration Frequency Spectrum

Figure 2:
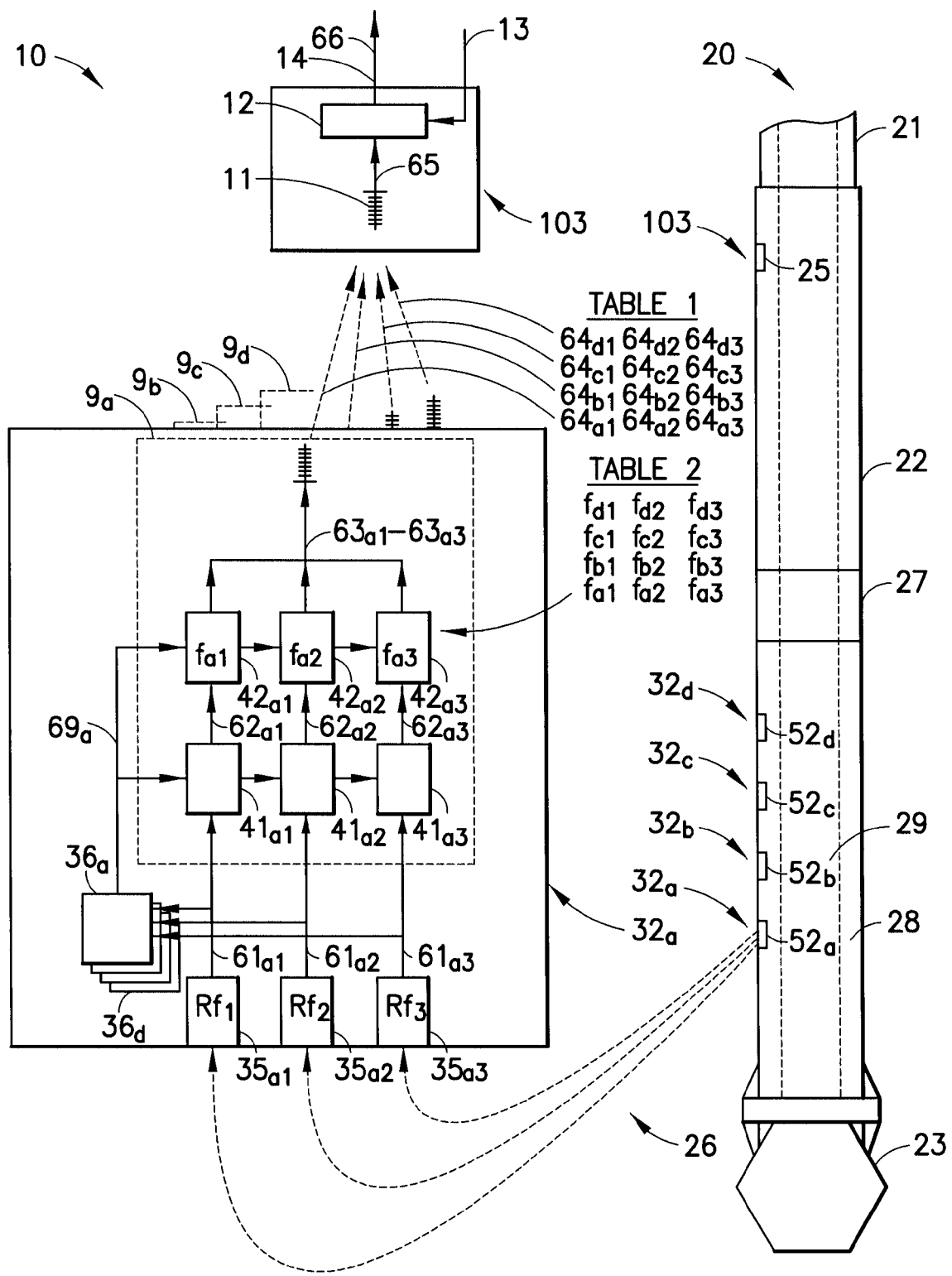
FIG. 2 shows a first preferred embodiment of a distributed system powered by ambient energy, and directed to determining vibration frequency spectrum, the system having multiple sensors and wireless transmission.

FIG. 2 shows a first preferred embodiment directed to determining vibration frequency spectrum. Distributed System 10 provides a self-powered method for determining the value of vibration frequency spectrum of ambient kinetic energy at a plurality of locations on a drilling assembly having a barrier.

In FIG. 2, as in FIG. 1, drill string 20 is shown having drill string tubular 21 that extends up the borehole to the surface station (not shown). Drilling assembly 22 includes drill bit 23 and drilling assembly tubing 28. Drilling assembly tubing 28 defines central aperture 29. Drilling assembly 22 is shown having a barrier 27 representing components that preclude the running of electrical wires along the length of the drilling assembly.

Distributed System 10 operates in essentially the same way as System 1. In distributed system 10, sensor-transmitter stations $32_a$-$32_d$ generate first signals $61_{a1}$-$61_{a3}$ (& $61_{b1}$-$61_{d3}$, not shown) and second signals $64_{a1}$-$64_{d3}$ (see Table 1 in FIG. 2) from ambient energy 26 at locations $52_a$-$52_d$ on the lower end of downhole drilling assembly 22. Sensor-transmitter stations $32_a$-$32_d$ then transmit second signals $64_{a1}$-$64_{d3}$ up the borehole by wireless transmission to receiver station 103 located proximate to the upper end of drilling assembly 22.

Energy-harvesting sensors $34_{a1}$-$34_{d3}$ (sensors $34_{b1}$-$34_{d3}$ are not shown) draw energy from ambient energy 26 and produce first signals $61_{a1}$-$61_{d3}$, each signal having signal energy, the signal energy carrying information representing the value of vibration frequency spectrum of ambient energy. Each of signal conditioners $36_a$-$36_d$, receives a portion of the signal energy of its corresponding first signal of first signals $61_{a1}$-$61_{d3}$ and transforms it into a form suitable for transmission to make its corresponding second signal of second signals $64_{a1}$-$64_{d3}$.

Each of sensor-transmitter stations $32_a$-$32_d$ is self-powered using energy harvesting. Power conditioners $36_a$-$36_d$ each receive a portion of the signal energy of their corresponding first signals from among first signals $61_{a1}$-$61_{d3}$. For example, power conditioner $36_a$ receives a portion of the signal energy of first signals $61_{a1}$-$61_{a3}$. Power conditioner $36_a$ conditions this incoming power to make conditioned electric power $69_a$. In the presently illustrated embodiment, conditioned electric power $69_a$ powers signal conditioner $9_a$. Such an illustration is solely for clarity and simplicity in describing the current invention. One skilled in the art will readily recognize that numerous alternative powering mechanisms exists.

Referring to FIG. 2, receiver station 103 receives second signals $64_{a1}$-$64_{d3}$ and transmits signal 66 up drill string 20 to surface station along data path 14. Receiver station 3 is powered by receiving electric power 13 from surface station (not shown) via drill string 20.

Figure 5:
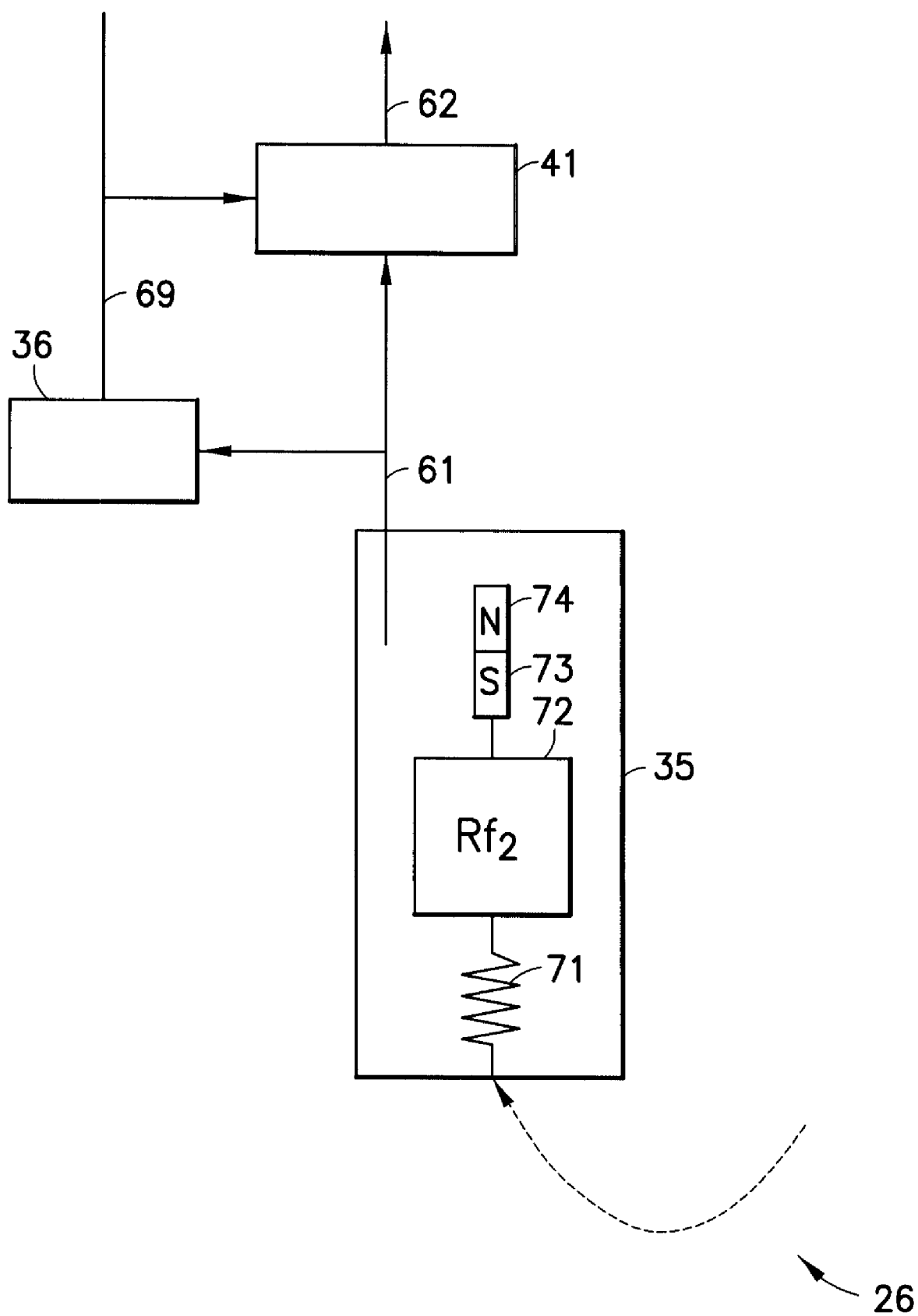
FIG. 5 shows the energy-harvesting sensor of the embodiments of FIGS. 2-4.

An energy-harvesting vibration sensor 35 is shown in detail in FIG. 5. The energy-harvesting sensor includes spring 71, mass 72, magnet 73, and coil 74. The spring, the mass, the magnet and the coil are coupled such that ambient kinetic energy 26 applied at one end of spring 71 produces vibration in mass 72 and magnet 73. Vibration of magnet 73 within coil 74 produces an alternating electric current whose signal energy, and information representing the value of the attribute, is contained in first electrical signal 61. In a setting where ambient energy 26 is great, the signal energy 61 of the magnet bearing mass will be great. Alternatively, a setting with low ambient energy 26 results in a correspondingly lower signal energy 61. Transitions between various ambient energy 26 conditions, as may be encountered in a borehole, are therefore easily distinguished based upon the signal energy 61. Both the energy and the information are coupled as inputs to pulse transformer 41 and power conditioner 5.

Referring to FIG. 2, power conditioner $36_a$ accepts energy from alternating current signal energy $61_{a1}$, $61_{a2}$, and $61_{a2}$, and converts this energy into regulated electric power by conventional rectification and filtering means. One skilled in the art will recognize that the use of alternating current in the present embodiment is for illustrative purposes and is not limiting in scope. This regulated electric power powers signal conditioner 9, which includes pulse transformers $41_a$, $41_b$, $41_c$, and $41_d$, and signal conditioner/drivers $42_a$, $42_b$, $42_c$, and $42_d$.

Figure 7:
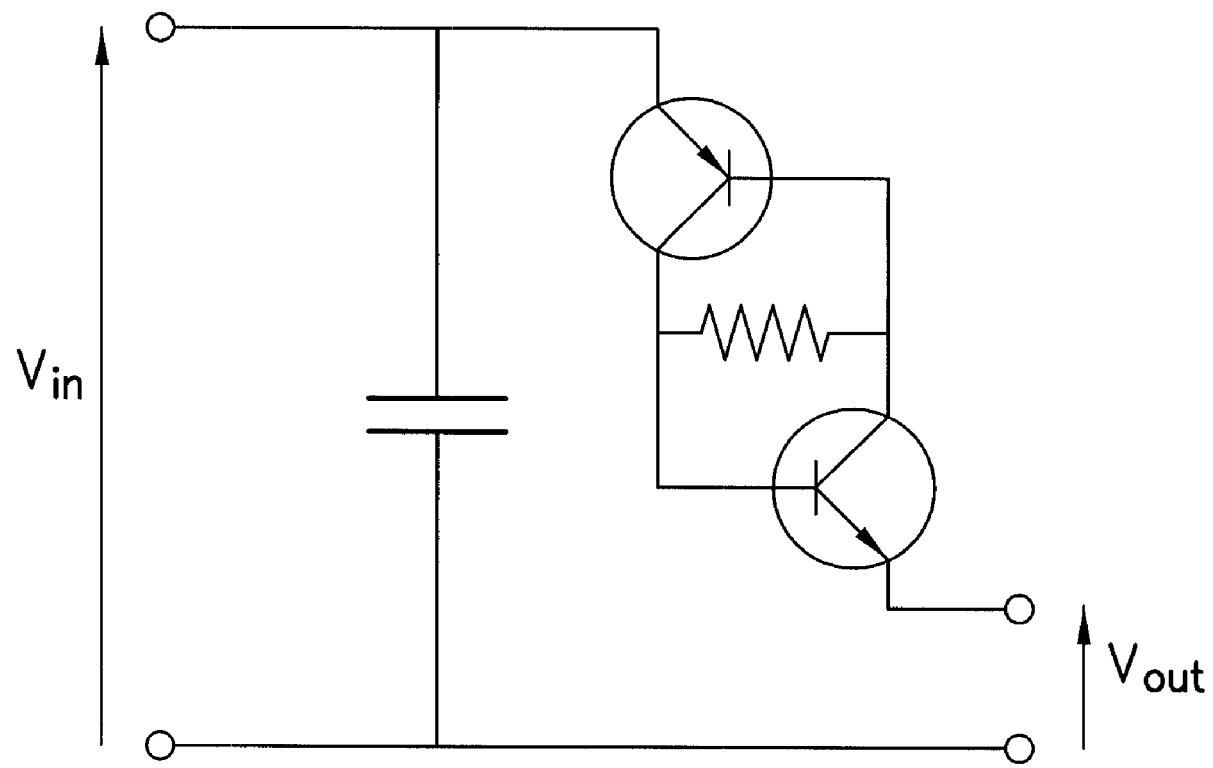
FIG. 7 shows the relaxation oscillator of the signal conditioners.
Figure 8:
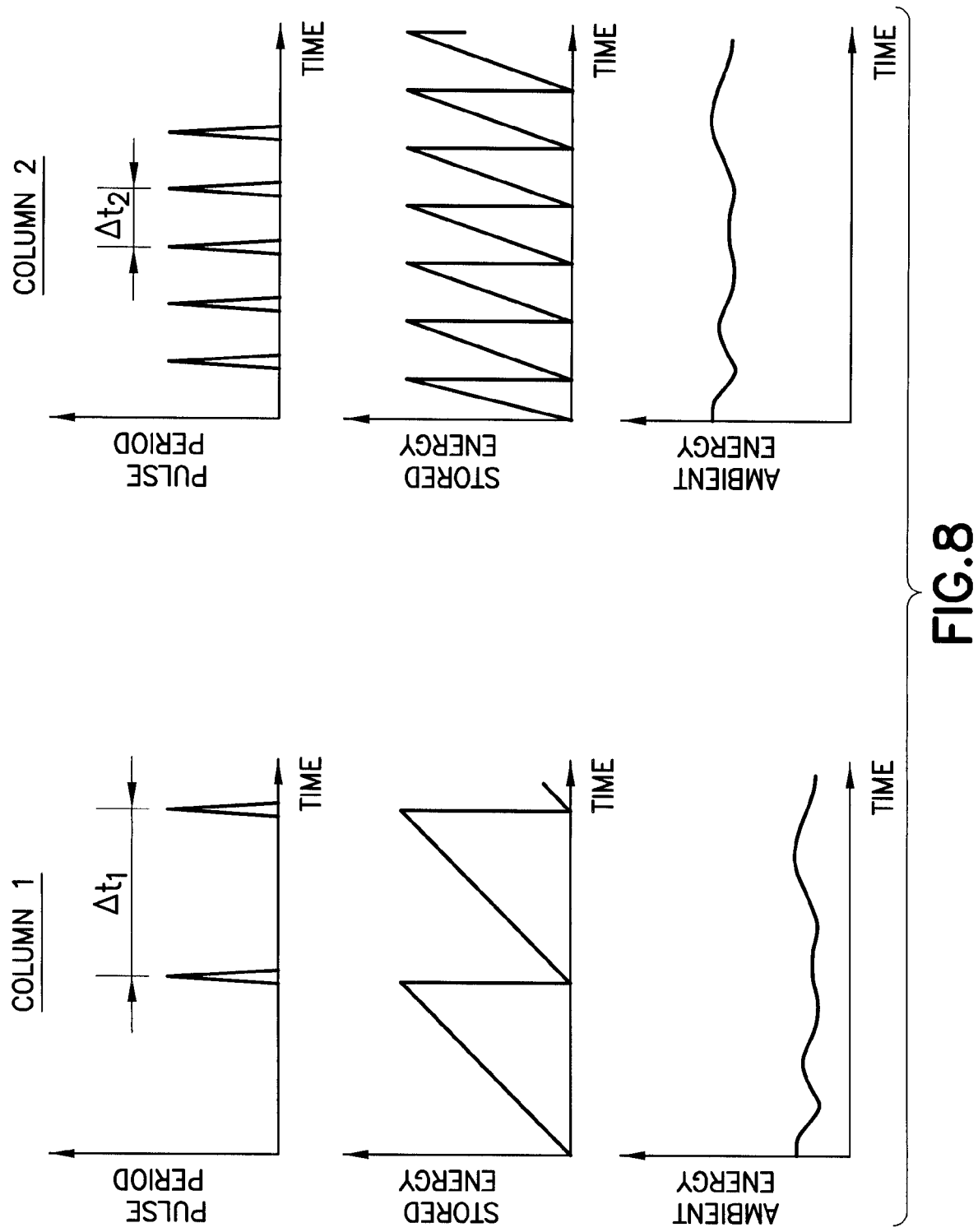
FIG. 8 shows the pulse shapes of the pulses generated by the pulse transformer.

Each pulse transformer 41 receives electrical signal 61 as a first series of pulses of current, and stores these pulses as electrical charge on the storage capacitor of a conventional threshold circuit, such as that illustrated in FIG. 7. As shown in FIG. 8, column 1, a low level of ambient energy ramps up the voltage on the storage capacitor until the voltage reaches the threshold voltage. Each time the voltage reaches the threshold voltage the circuit switches on and releases the charge as one of a second series of pulses of current. Since the level of ambient energy is low, the pulses of the second series of pulses of current are released at long time intervals $\Delta t_1$. Correspondingly, when the level of ambient energy is high, as shown in FIG. 8, column 2, the pulses of the second series of pulses of current are released more frequently at short time intervals $\Delta t_2$. In this way an output signal is produced having a frequency that increases as ambient energy level increases. In the embodiment of FIG. 2, the twelve output signals $61_{a1}$-$61_{d3}$ listed in Table 1 of FIG. 2, are transmitted as wireless signals.

Referring to FIG. 2, distributed System 10 has three energy-harvesting vibration sensors $35_{a1}$-$35_{a3}$, and four signal conditioners $9_a$-$9_d$. Each signal conditioner has three pulse transformers and three signal conditioners, e.g., signal conditioner $9_a$ has three pulse transformers $41_{a1}$-$41_{a3}$, and three signal conditioner/multiplexers $42_{a1}$-$42_{a3}$.

The three energy-harvesting vibration sensors $35_{a1}$, $35_{a2}$ and $35_{a3}$ each have different resonant frequency, frequencies, $Rf_1$, $Rf_2$ and $Rf_3$ respectively in FIG. 2. By measuring over a range of frequencies, the three vibration sensors determine vibration frequency over a spectrum of frequencies. In other embodiments a larger number of vibration sensors would determine vibration frequency spectrum over a broader spectrum of frequencies, or over the same spectrum of frequencies with greater resolution.

Note that first signals $61_{a1}$, $61_{a2}$ and $61_{a3}$ are coupled to pulse transformers $41_{a1}$, $41_{a2}$, and $41_{a3}$ respectively, and that first signals $61_{a1}$, $61_{a2}$ and $61_{a3}$ are also coupled to shared power conditioner $36_a$. Power conditioner $36_a$ provides power via to all powered components in signal conditioner $9_a$.

Referring to FIG. 2, the four sensor-transmitter stations $32_a$-$32_d$, include four signal conditioners $9_a$-$9_d$. Each signal conditioner includes three signal conditioner/multiplexers $42_{a1}$-$42_{a3}$. The four signal conditioners $9_a$-$9_d$ transmit twelve signals from the four antennas $17_a$-$17_d$. The twelve signals are listed in Table 1 of FIG. 2. The twelve signals are multiplexed for wireless transmission. In this first preferred embodiment, conventional frequency division multiplexing, as well known in the art, is used. The twelve signal conditioner/multiplexers $42_{a1}$-$42_{a3}$ each contain frequency multiplexing circuits, and each has a unique frequency in the range $f_{a1}$-$f_{a3}$ as listed in Table 2 of FIG. 2.

The three energy-harvesting vibration sensors $35_{a1}$, $35_{a2}$ and $35_{a3}$ differ from one another in that they have different resonant frequencies. The three pulse transformers $41_{a1}$-$41_{a3}$ are preferably identical to each other.

The three signal conditioner/multiplexers $42_{a1}$-$42_{a3}$ of signal conditioner $9_a$ are alike in that they all use the same signal conditioner circuits, but they differ in that they each impose a different carrier for signal multiplexing.

Second Embodiment, Determining Vibration Frequency

Figure 3:
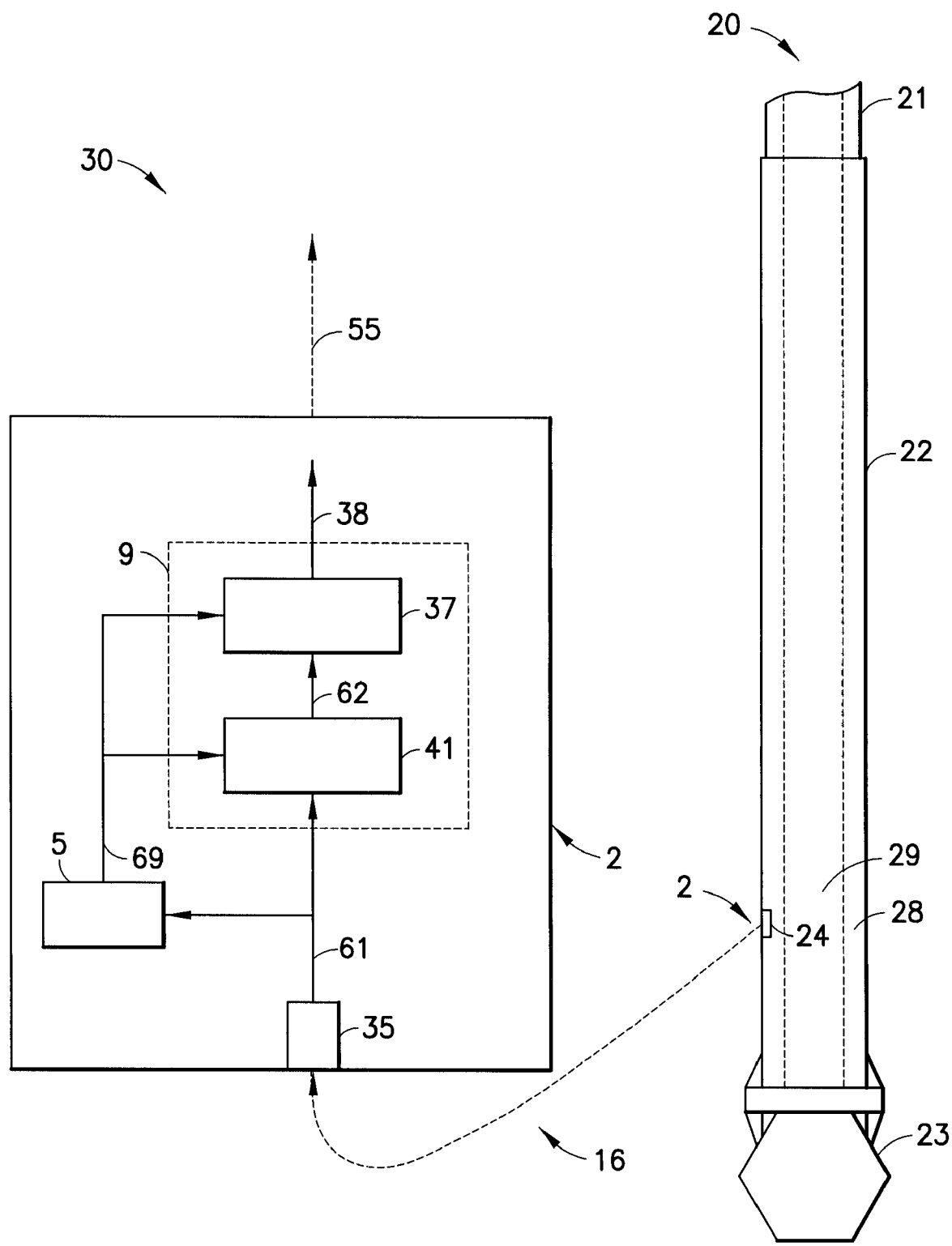
FIG. 3 shows an system powered by ambient energy, and directed to determining vibration frequency, the system having a single sensor and wired transmission.

FIG. 3 shows a second embodiment directed to determining vibration frequency. As understood by one skilled in the art, this embodiment is representative of one suitable arrangement for practicing the present invention and is not intended to be limiting in scope.

Figure 6:
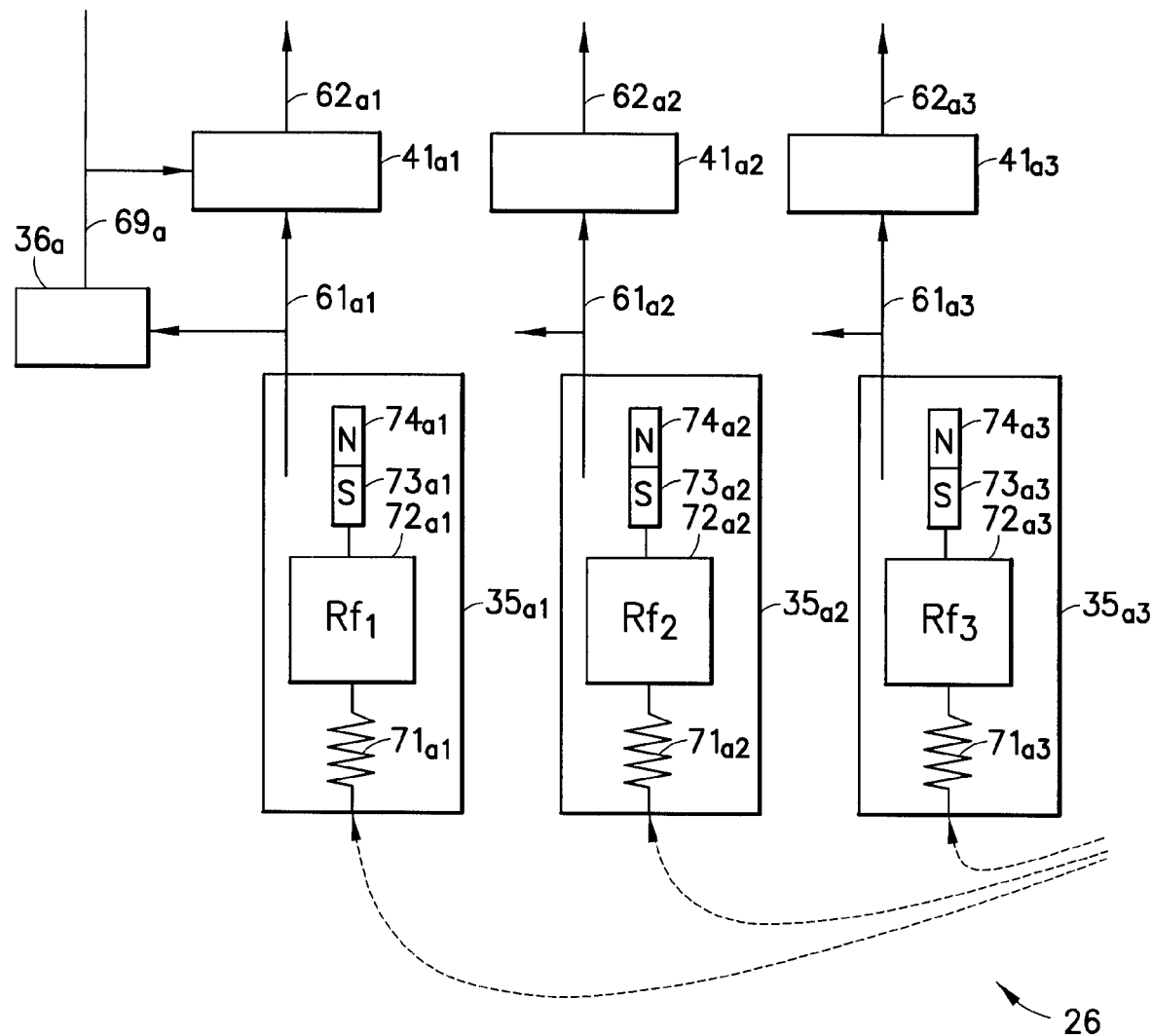
FIG. 6 shows the three energy-harvesting sensors configured for determining vibration frequency spectrum, as used in the embodiments of FIGS. 2 and 4.
Figure 9:
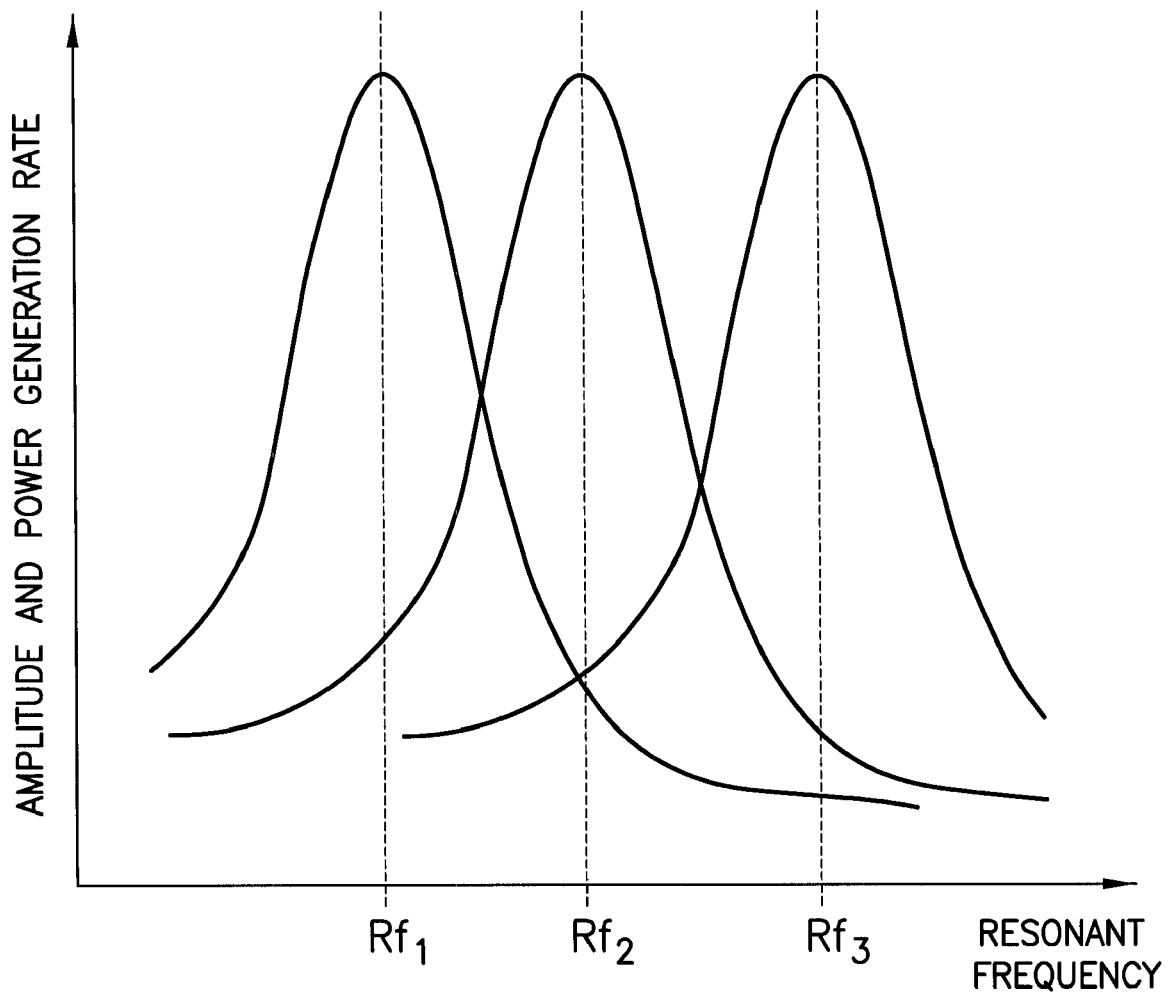
FIG. 9 shows the three resonant frequencies of the three energy-harvesting sensors.

System 30 provides a self-powered method for determining the value of vibration energy at a single vibration frequency at a single location on a drilling assembly having no barrier. System 30 uses a single energy-harvesting vibration sensor 35, and transmits a second signal 38 either along a wired connection, or by wireless connection, to the surface station (not shown). As illustrated in FIG. 6, multiple energy-harvesting vibration sensors $35_{a1}$-$35_{a2}$ may be used in practicing the present invention. Each of these energy-harvesting vibration sensors $35_{a1}$-$35_{a2}$ may have a specific resonant frequency (i.e. $Rf_1$, $Rf_2$, $Rf_3$). These individual resonant frequencies are illustrated at FIG. 9 wherein the individual resonant frequency of each energy-harvesting vibration sensor $35_{a1}$-$35_{a2}$ is plotted.

Energy-harvesting vibration sensor 35 is as shown in FIG. 5 and operates as described above to produce first signal 61.

Pulse transformer 41 receives first signal 61 as a first series of pulses of current and stores these pulses as electrical charge on the storage capacitor of a conventional threshold circuit, as discussed above and as that illustrated in FIG. 7. In one embodiment, these series of pulses may form a sinusoidal wave arrangement. One skilled in the art will readily recognize that the series of pulses may take numerous alternative forms. Output signal 38 is produced in signal conditioner/driver 37 having a pulse frequency that increases as ambient vibration energy level increases. In the embodiment of FIG. 3, output signal 38 may be transmitted as wireless or wire-connected signal 55.

Third Embodiment, Vibration Frequency Spectrum, Wired Transmission

Figure 4:
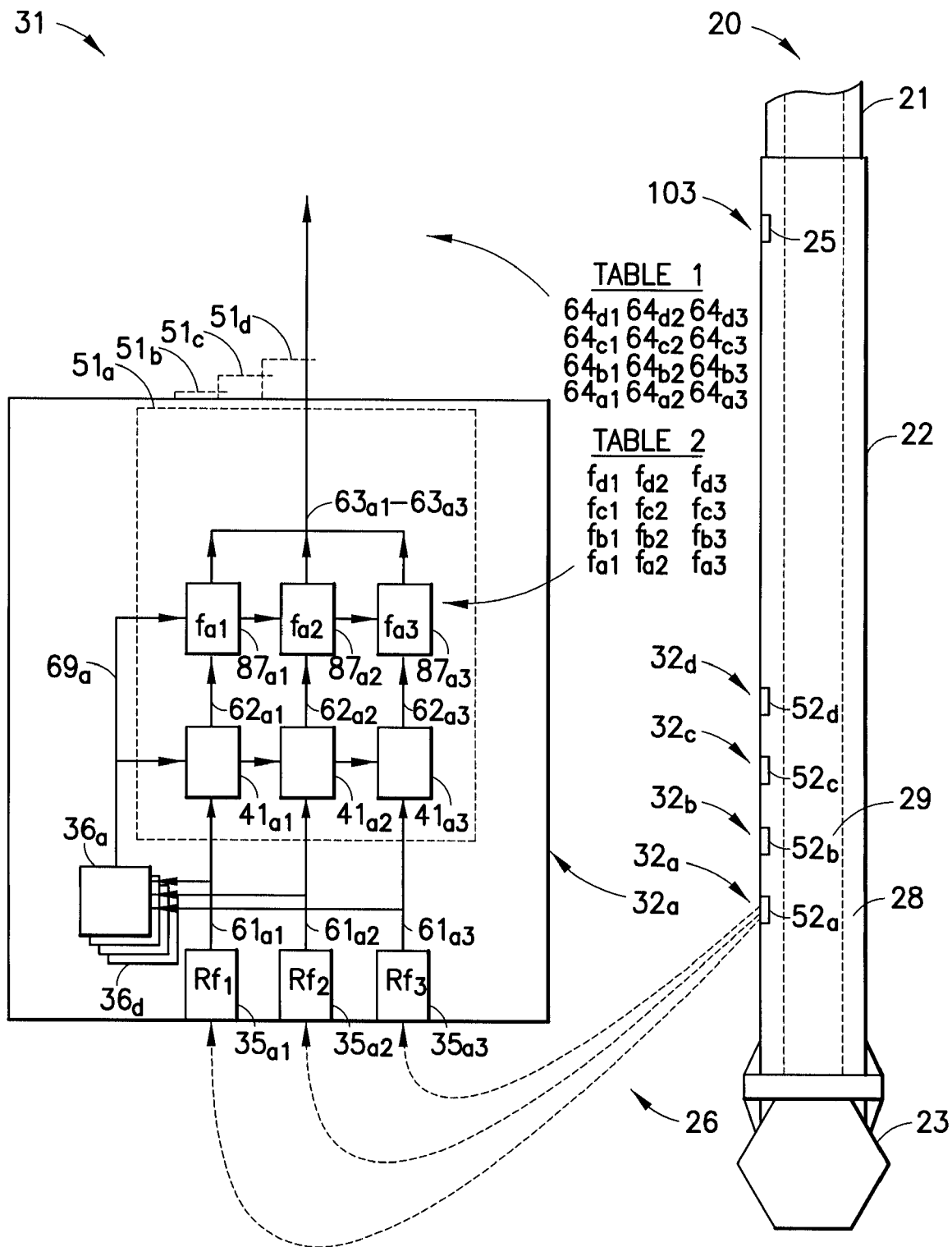
FIG. 4 shows a distributed system powered by ambient energy, and directed to determining vibration frequency spectrum, the system having multiple sensors and wired transmission.

FIG. 4 shows a third embodiment directed to determining vibration frequency spectrum having wired transmission. The embodiment of FIG. 4 is representative of one suitable arrangement for practicing the present invention. System 30 provides a self-powered method for determining vibration frequency spectrum at a plurality of locations on a drilling assembly. System 30 uses a single energy-harvesting vibration sensor 35, and transmits a second signal 38 either along a wired connection, or directly by wireless connection, to the surface station (not shown). Note that frequency modulation is required but the driver circuits of signal conditioner/multiplexers 87 will differ from the driver circuits of signal conditioner/multiplexers 42 of the first preferred embodiment shown in FIG. 2.

Second Preferred Embodiment, Determining Pressure Difference

Figure 10:
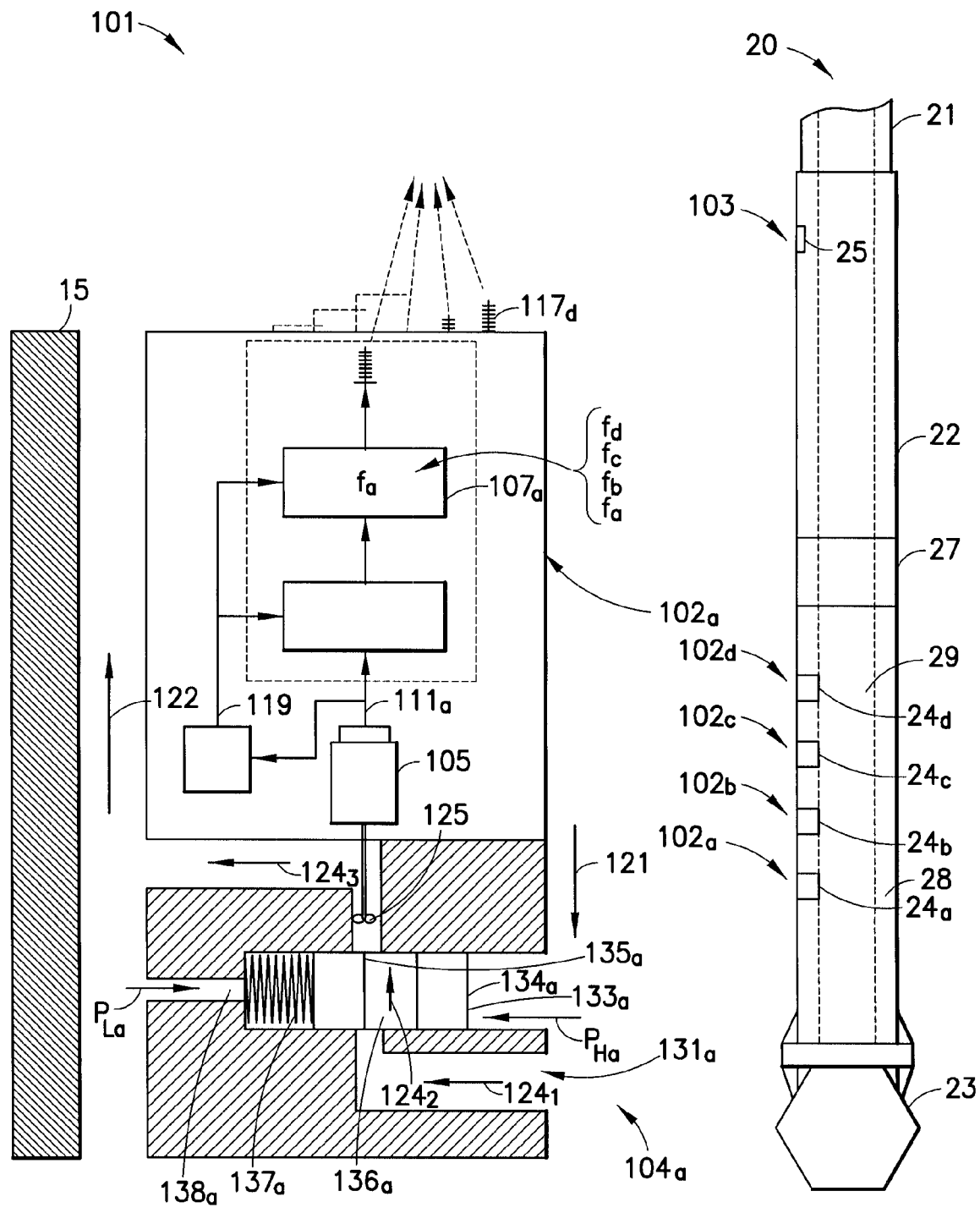
FIG. 10 shows a distributed system powered by ambient energy, and directed to determining pressure difference.

FIG. 10 shows a second preferred embodiment directed to determining pressure difference. Distributed System 101 provides a self-powered method for determining the value of pressure difference of ambient hydraulic energy at a plurality of locations on drilling assembly 22. The pressure difference is the difference between the (generally higher) pressure of fluid within the central aperture of the drilling assembly and the (generally lower) pressure of fluid between the drilling assembly and the formation. In FIG. 10, as in FIG. 1, drill string 20 includes a barrier 27 representing components that preclude the running of electrical wires along the length of the drilling assembly.

The main difference between the second preferred embodiment of FIG. 10 and the first preferred embodiment of FIG. 2, is that the sensor-transmitter stations $107_a$-$107_d$ in FIG. 10 include pressure-difference sensor-transmitter stations $104_a$-$104_d$, respectively.

Except for the difference between the energy-harvesting sensors, Distributed System 101 operates in substantially the same way as distributed System 10 of FIG. 2.

Distributed System 101 includes four energy-harvesting sensors $104_a$-$104_d$. A skilled artisan will recognize that various numbers and arrangements of energy-harvesting sensors are directly applicable to the present invention. The illustration of a system with four energy-harvesting sensors is solely for illustrative purposes. Energy-harvesting sensor $104_a$ comprises a turbine electrical generator $105_a$ with turbine blades $125_a$, and a valve adapted to control mud flow $124_1$, $124_2$ and $124_3$ through by-pass flow line $131_a$ in wall 28 of drilling assembly 22. As shown in FIG. 10, valve $126_a$ includes cylindrical piston block $133_a$, having a first piston-end $134_a$ and a second piston-end $135_a$. Preferably, valve $126_a$ is a slide valve, a pressure-operated, piston-driven, spring-loaded slide valve. One skilled in the art will recognize, however, that numerous alternative valve arrangements are suitable for use in practicing the present invention. Valve $126_a$ defines a variable resistance passage $136_a$ between the two piston-ends. High pressure $P_{Ha}$ exerts pressure on first piston-end $134_a$. Low pressure $P_{La}$ exerts pressure on second piston-end $135_a$, acting through vent $137_a$. Spring $138_a$ also exerts pressure on second piston-end $135_a$. Valve $126_a$ is designed to control flow $124_{a1}$, $124_{a2}$ and $124_{a3}$ in accordance with the pressure difference $P_{Ha}$-$P_{La}$. $P_{Ha}$-$P_{La}$ is the difference between the pressure of fluid within the central aperture of the drilling assembly and the pressure of fluid between the downhole drilling assembly and the formation.

Third Preferred Embodiment, Determining Temperature Difference

Figure 11:
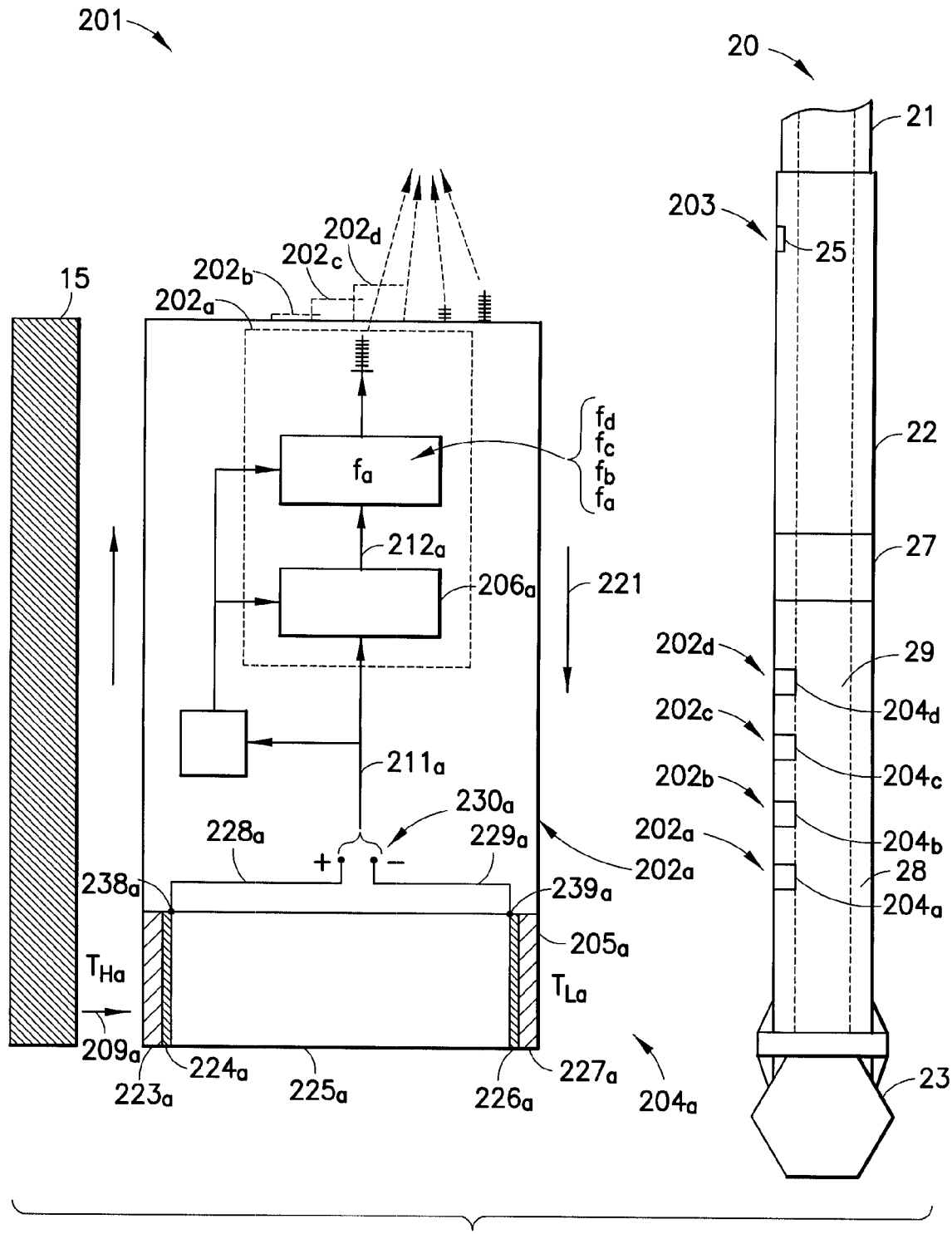
FIG. 11 shows a distributed system powered by ambient energy, and directed to determining temperature difference.

FIG. 11 shows a third preferred embodiment directed to determining temperature difference. Distributed System 201 provides a self-powered method for determining the value of temperature difference of ambient thermal energy at a plurality of locations on drilling assembly 22. The temperature difference measured is the difference between the generally higher temperature $209_a$ of fluid between the drilling assembly and the formation and the generally lower temperature $204_a$ of fluid within the central aperture of the drilling assembly. In FIG. 11, as in FIGS. 1 and 10, drill string 20 includes a barrier 27 representing components that preclude the running of electrical wires along the length of the drilling assembly.

The main difference between the third preferred embodiment of FIG. 11 and the first preferred embodiment of FIG. 2, is that the sensor-transmitter stations $204_a$-$204_d$ in FIG. 11 include temperature-difference sensor-transmitter stations $202_a$-$202_d$, respectively.

Except for the difference between the energy-harvesting sensors, distributed system 201 operates in substantially the same way as distributed System 10 of FIG. 2.

Distributed system 101 includes four energy-harvesting sensors $104_a$-$104_d$. Energy-harvesting sensor $104_a$ Distributed System 201 includes four energy-harvesting sensors $202_a$-$202_d$. Energy-harvesting sensor $202_a$ comprises a voltage generator $205_a$ using the Seebeck Effect.

FIG. 11 shows heat $209_a$ flowing out from the formation. The higher temperature $T_{Ha}$ at junction $238_a$, and the lower temperature $T_{La}$ at junction $239_a$ at central aperture 29 produces a voltage across first and second output leads $228_a$ and $229_a$. Signal output $211_a$ from voltage generator $205_a$ is coupled, at output terminals $230_a$, to the input of pulse generator $206_a$. Signal $212_a$ is used to charge a capacitor (not shown) in pulse generator $206_a$, and from the charging of the capacitor pulse generator $206_a$ produces a series of pulses representing temperature difference.

FIG. 12 is a flowchart illustrating the steps necessary in practicing one method of the present invention. In accordance with step 81, ambient energy is harnessed to produce a first signal having a first signal energy carrying information representing a value of an attribute. As set forth prior, this value of an attribute may take several forms, including, but not limited to, vibration frequency spectrum, pressure difference, and temperature difference. In accordance with the present invention, ambient energy includes, but is not limited to, kinetic energy, hydraulic energy and thermal energy.

Power and information derived from the first signal is then used to produce a second signal. This second signal carries information representing the value of the attribute under investigation. (Step 82) This second signal is then transmitted from a sensor-transmitter station at a lower location on the drilling assembly (step 83). This signal is then received at a receiver station at an upper location on the drilling assembly (step 94). As set forth prior, this transmission of a signal from a lower location to an upper location may take numerous forms, including wireless transmission, optical transmission, acoustic transmission, or wired transmission. The aforementioned transmission forms are not intended to be an exhaustive list of potential transmission methods and are not to be viewed as limiting the scope of the present invention.

The foregoing description is presented for purposes of illustration and description, and is not intended to limit the invention in the form disclosed herein. Consequently, variations and modifications to the inventive drilling system sensors powered by an energy-harvesting sensor systems, methods and computer program products described commensurate with the above teachings, and the teachings of the relevant art, are deemed within the scope of this invention. These variations will readily suggest themselves to those skilled in the relevant oilfield, electronic, electro-mechanical and other relevant industrial art, and are encompassed within the spirit of the invention and the scope of the following claims. Moreover, the embodiments described are further intended to explain the best mode for practicing the invention, and to enable others skilled in the art to utilize the invention in such, or other, embodiments, and with various modifications required by the particular applications or uses of the invention. It is intended that the appended claims be construed to include all alternative embodiments to the extent that it is permitted in view of the applicable prior art.

What is claimed is:

1. A self-powered method for determining the value of an attribute of ambient energy at one or more locations on a downhole drilling assembly, the method comprising:
   attaching a sensor-transmitter station to the downhole drilling assembly;
   the sensor-transmitter station harnessing ambient energy to produce a first signal having first signal energy carrying information representing the value of the attribute; and
   using power and information derived from the first signal energy to produce second signal carrying information representing the value of the attribute.

2. A method according to claim 1, further comprising transmitting the second signal from a transmitter station at a first location on the downhole drilling assembly using power derived from the first signal energy.

3. A method according to claim 2, further comprising receiving the second signal at a receiver station at a second location on the downhole drilling assembly.

4. A method according to claim 3, further comprising transmitting a third signal from the second location on the downhole drilling assembly to a surface station.

5. A method according to claim 4, further comprising extracting the value of the attribute at the surface station from the third signal.

6. A method according to claim 4, further comprising extracting the value of the attribute at a surface station from a signal derived from the second signal.

7. A method according to claim 1, wherein the second signal is a wireless signal.

8. A method according to claim 1, further comprising extracting the value of the attribute at a surface station from the second signal.

9. A method according to claim 1, further comprising:
   producing the first signal at a lower location on the downhole drilling assembly;
   receiving the second signal at an upper location on the downhole drilling assembly; and
   transmitting a third signal carrying information representing the value of the attribute from the upper location.

10. A method according to claim 1, wherein the attribute is vibration frequency spectrum.

11. A method according to claim 10, wherein producing the first signal includes:
    transforming ambient energy into vibration of a magnet bearing mass; and
    transforming vibration of the magnet bearing mass into a first signal having a first series of pulses of electrical energy with a first pulse frequency representing a value of the vibration frequency spectrum.

12. A method according to claim 10, further including carrying information representing the value of the vibration frequency spectrum in the second signal as a second series of pulses.

13. A method according to claim 12, wherein producing the second signal includes:

storing the first series of pulses as an electric charge in a relaxation circuit; and transmitting the electric charge as a second series of pulses having a second pulse frequency representing a value of the vibration frequency spectrum.

14. A method according to claim 1, wherein the attribute is pressure difference.

15. A method according to claim 14, further comprising:
transforming ambient energy of pressure difference into fluid flow;
transforming fluid flow into a first signal having a first series of pulses of electrical energy with a first pulse frequency representing a value of the pressure difference;
storing the first series of pulses as an electric charge in a relaxation circuit; and
transmitting the electric charge as a second series of pulses having a second pulse frequency representing a value of the pressure difference.

16. A method according to claim 15, wherein the pressure difference is the difference between the pressure of fluid within the central aperture of the downhole drilling assembly and the pressure of fluid between the downhole drilling assembly and the formation.

17. A method according to claim 1, wherein the attribute is temperature difference.

18. A method according to claim 17, further comprising:
transforming ambient energy of temperature difference into a first signal having a first series of pulses of electrical energy with a first pulse frequency representing a value of the temperature difference;
storing the electrical energy as an electric charge in a relaxation circuit; and
transmitting the electric charge as a second series of pulses having a second pulse frequency representing a value of the temperature difference.

19. A method according to claim 18, wherein the temperature difference is the difference between the temperature of fluid between the downhole drilling assembly and the formation and the temperature of fluid within the central aperture of the downhole drilling assembly.

20. A sensor-transmitter station adapted for mounting on a downhole drilling assembly, for use in a system for determining the value of an attribute of ambient energy at the downhole drilling assembly, the sensor-transmitter station comprising:
an energy-harvesting sensor;
a signal conditioner; and
a power conditioner,
wherein the energy-harvesting sensor is mounted to receive ambient energy from the downhole drilling assembly and is coupled to deliver a first signal representing the value of the attribute to both the signal conditioner and the power conditioner, and
wherein the power conditioner is coupled to deliver conditioned power to the signal conditioner.

21. A sensor-transmitter station according to claim 20, further comprising an antenna coupled to receive an output signal from the signal conditioner.

22. A sensor-transmitter station according to claim 20, wherein the signal conditioner includes a pulse transformer coupled to receive the first signal as a first series of pulses from the energy-harvesting sensor, and a signal conditioner to receive pulses from the pulse transformer and to produce a second signal carrying a series of pulses for transmission.

23. A sensor-transmitter station according to claim 22, wherein the pulse transformer includes a threshold circuit including a relaxation oscillator.

24. A sensor-transmitter station according to claim 20, wherein the attribute is vibration frequency spectrum; and
wherein the energy-harvesting sensor comprises a spring, a mass, a magnet, and a coil, the spring, mass, magnet and coil coupled such that ambient kinetic energy applied at one end of the spring produces vibration in the mass and the magnet, and vibration of the magnet within the coil produces an alternating electric current carrying information representing the value of the attribute.

25. A sensor-transmitter station according to claim 20, wherein the attribute is pressure difference; and
wherein the energy-harvesting sensor comprises a turbine electrical generator having a turbine located within a sample flow line through a wall of the downhole drilling assembly, and a valve adapted to control flow through the sample flow line in accordance with the pressure difference.

26. A sensor-transmitter station according to claim 25 wherein the valve is a pressure-operated, piston-driven, spring-loaded sleeve valve.

27. A sensor-transmitter station according to claim 20 wherein the attribute is temperature difference, and wherein the energy-harvesting sensor comprises a Seebeck Effect electric signal generator.

28. A self-powered system for determining the value of an attribute of ambient energy at one or more locations at the surface of a downhole drilling assembly, the system comprising:
a sensor-transmitter station adapted for mounting at a first location on the downhole drilling assembly, the sensor-transmitter station including an energy-harvesting sensor, a signal conditioner, and a power conditioner, the energy-harvesting sensor mounted to receive ambient energy at the downhole drilling assembly and coupled to deliver a signal having signal energy, the signal energy carrying information representing the value of the attribute, to the power conditioner and to the signal conditioner; and
a receiver station, adapted for mounting at a second location on the downhole drilling assembly, and adapted to receive a signal transmitted by the sensor-transmitter station;
wherein the power conditioner is coupled to power the signal conditioner.

29. An system according to claim 28, wherein the sensor-transmitter station is located proximate to the drill bit end of the downhole drilling assembly, and wherein the receiver station is located proximate to the drill string end of the downhole drilling assembly.

30. An system according to claim 28, wherein the signal conditioner includes a threshold circuit.

31. An system according to claim 28, wherein each sensor-transmitter station is adapted to transmit signals, the signals from each station carrying a distinct frequency that identifies the location of the station on the downhole drilling assembly.

32. An system according to claim 28,
wherein the attribute is vibration frequency spectrum; and
wherein the energy-harvesting sensor comprises a spring, a mass, a magnet, and a coil, the spring, mass, magnet and coil coupled such that ambient kinetic energy applied at one end of the spring produces vibration in the mass and the magnet, and vibration of the magnet within the coil produces an alternating electric current carrying information representing the value of the attribute.

33. A sensor-transmitter station according to claim 28,
wherein the attribute is pressure difference; and wherein the energy-harvesting sensor comprises a turbine electrical generator having a turbine located within a sample flow line through a wall of the downhole drilling assembly, and a valve adapted to control flow through the sample flow line in accordance with the pressure difference.

34. A sensor-transmitter station according to claim 28 wherein the attribute is temperature difference, and wherein the energy-harvesting sensor comprises a Seebeck Effect electric signal generator.

35. A distributed system adapted for mounting on a downhole drilling assembly, for determining the value of an attribute of ambient energy at a plurality of sensor assembly locations on the body of the downhole drilling assembly, the system comprising:
   a plurality of sensor-transmitter stations mounted at spaced intervals along the body of the downhole drilling assembly, each sensor-transmitter station including at least one energy-harvesting sensor and a signal conditioner; and
   a receiver station mounted on the body of the downhole drilling assembly, at a location above the sensor-transmitter stations;
   wherein each sensor-transmitter station is adapted to transform ambient energy into a first signal having signal energy, the signal energy carrying information representing the value of the attribute, such that the energy of the output signal of each sensor-transmitter assembly is derived entirely from signal energy.

36. A distributed system according to claim 35, wherein each signal conditioner includes a pulse transformer coupled to receive a first signal from its associated energy-harvesting sensor, and a signal conditioner/driver coupled to receive an output signal from its associated pulse transformer.

37. A distributed system according to claim 36, wherein the pulse transformer includes a threshold circuit including a relaxation oscillator.

38. A distributed system according to claim 35, wherein the receiver station is associated with a storage device adapted to receive and store information derived from the output signal of each sensor-transmitter assembly.

* * * * *